United States Patent [19]

Wada

[11] Patent Number: 4,865,438

[45] Date of Patent: Sep. 12, 1989

[54] SPECTACLES PROVIDED WITH A MAGNIFIER HAVING AN AUTOMATIC FOCUSING FUNCTION

[76] Inventor: Juro Wada, 21-6-602, Nishiikebukuro 5-chome, Toshima-ku, Tokyo, Japan

[21] Appl. No.: 140,156

[22] Filed: Dec. 31, 1987

[30] Foreign Application Priority Data

Jun. 29, 1987 [JP] Japan ................. 62-163772

[51] Int. Cl.⁴ .................. G02C 1/00; G02B 25/00
[52] U.S. Cl. ..................... 351/158; 350/146
[58] Field of Search ............. 351/41, 158, 159, 165, 351/205; 350/133, 145, 146

[56] References Cited

U.S. PATENT DOCUMENTS 2,389,428 11/1945 Glasser ................ 350/146
4,418,990 12/1983 Gerber ................ 351/158

FOREIGN PATENT DOCUMENTS 55-52122 4/1980 Japan .

Primary Examiner—Rodney B. Bovernick
Assistant Examiner—P. M. Dzierzynski
Attorney, Agent, or Firm—Watson, Cole, Grindle & Watson

[57] ABSTRACT

Spectacles provided with a magnifier, in which magnifier elements are mounted on a body of spectacles, a distance to an object to be seen is measured, a movable lens encased in the magnifier element is controlled and driven forward or backward along an optical axis on the basis of the result of the measurement to automatically adjust the focal length of the magnifier elements. A user of spectacles can merely peep an object to be seen through the magnifier to always see a magnified image with the focal point adjusted.

20 Claims, 5 Drawing Sheets

SPECTACLES PROVIDED WITH A MAGNIFIER HAVING AN AUTOMATIC FOCUSING FUNCTION

BACKGROUND OF THE INVENTION

1. Field of the Invention

The present invention relates to spectacles that include a magnifier to thereby enable a wearer to see a magnified view of a portion of an object being viewed when desired.

2. Prior Art

Certain delicate medical procedures such as ophthalmologies vascular inosculations and nerve operations often require the surgeon to use microscope so as to see a magnified view of the fine tissues being operated on. Although a fixed-type microscope is sometimes used it has a limited field of view and since a microscope also has a shallow depth of field, focussing on various parts of a non-planar object requires sequential focusing operations. Moreover, where the affected part to be operated on can be temporarily seen by the naked eyes, the field of view is impaired by the fixed microscope, thereby making its use unsatisfactory.

Japanese Utility Model Laid-Open Publication No. 52122/1980 discloses spectacles which include magnifying elements fixedly mounted in respective mounting holes bored approximately in the center of each of the two lenses thereof. During an operation, a surgeon wears the spectacles like normal spectacles, and when he needs to see an enlarged view of an affected part, he peeps into the magnifier, whereas when this is not necessary he can shift his eyes and look at the affected part through the main lenses. For persons who require correction of visual abnormalities such as myopia, hypermetropy and astigmatisms, if the refractive index of the lenses are selected to suit the wearer, the visual power equal to routine-use spectacles may be obtained.

However, in the aforesaid spectacles, the focal point of the magnifying elements attached to the lenses are, i.e., a preset change in focal point during use is substantially impossible. Accordingly, during an operation it is necessary to always maintain a certain distance from the eyes to the affected part. This is very burdensome to a surgeon wearing the spectacles and may interfere with his ability to concentrate on the operation being conducted. Furthermore, frequent deviation in focal point resulting from movement of the wearer and movement of the magnified object (an object to be seen) may cause asthenopia, deterioration of vision, etc., if the spectacles are worn for a long period of time.

SUMMARY OF THE INVENTION

The present invention has been accomplished to overcome the disadvantages noted above with respect to the prior art. Accordingly, it is an object of the invention to provide spectacles provided with a magnifier and which can be worn in front of the eyes similarly to normal spectacles and which will enable the wearer to view an object in a non-magnified or in a magnified fashion, the magnifier being automatically adjustable in focal length so that an object will always be viewable therethrough in a well focused condition.

For achieving the aforesaid object, spectacles provided with a magnifier according to the present invention comprises a pair of main lenses, a connecting means extending between the main lenses, and a magnifier fixedly held on the connecting means and encasing therein a magnification lens which can automatically change a focal point while being adjusted to the distance to an object to be seen.

The connecting means of the spectacles can be a portion of standard spectacle frame having temples connected to opposite ends thereof as with reading glasses, or a spectacle frame having an annular band and a top band connected thereto as with certain industrial eye-protective goggles. It can also be a simple bridge that is connected between the main lenses, which are otherwise not encased.

At least one of a pair of magnification lenses constituting a magnifier can be moved along an optical axis to adjust the focal length of the magnifier. Means for adjusting the focal length consists of a sensor for measuring the distance to an object to be seen, a control circuit for outputting a drive signal in response to the distance by a range signal from the sensor, and power means driven by the drive signal from the control circuit to move at least one of the magnification lenses along the optical axis. With this, a user who wears the spectacles with a magnifier can look at an object to be seen without worrying about how far he is from the object being viewed.

Other objects and features of the present invention will be more apparent from the ensuing detailed description, taken in conjunction with the accompanying drawings.

DESCRIPTION OF THE PREFERRED EMBODIMENTS

Figure 1:
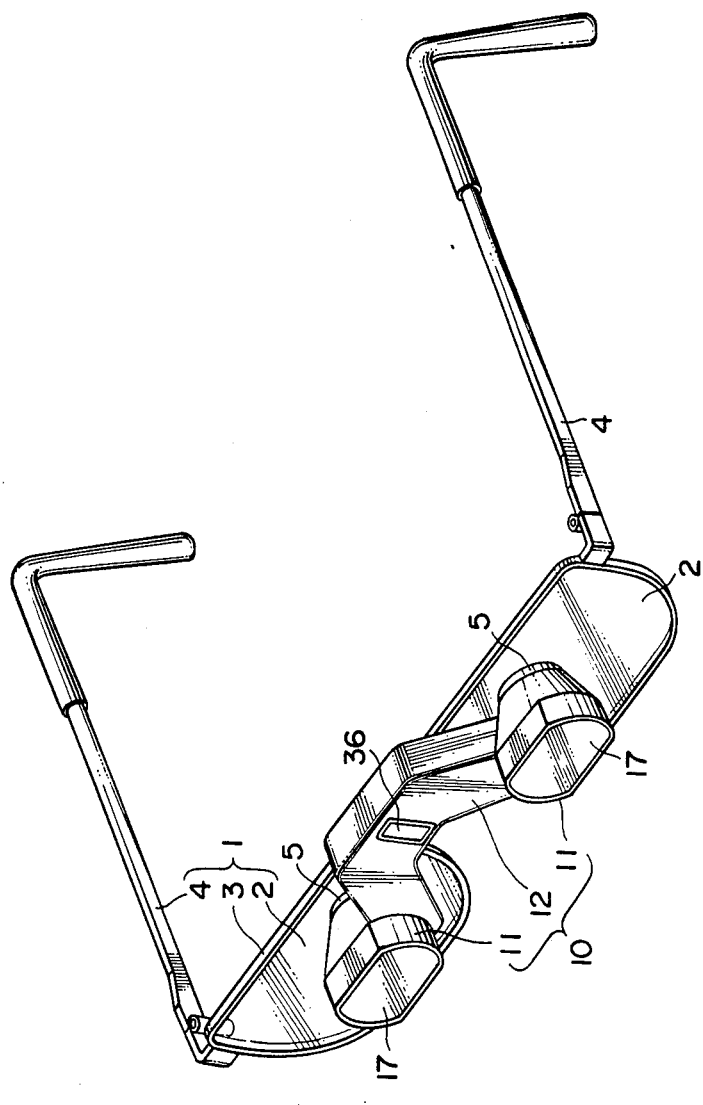
FIG. 1 is a perspective view showing one embodiment of spectacles with a magnifier according to the present invention.
Figure 2:
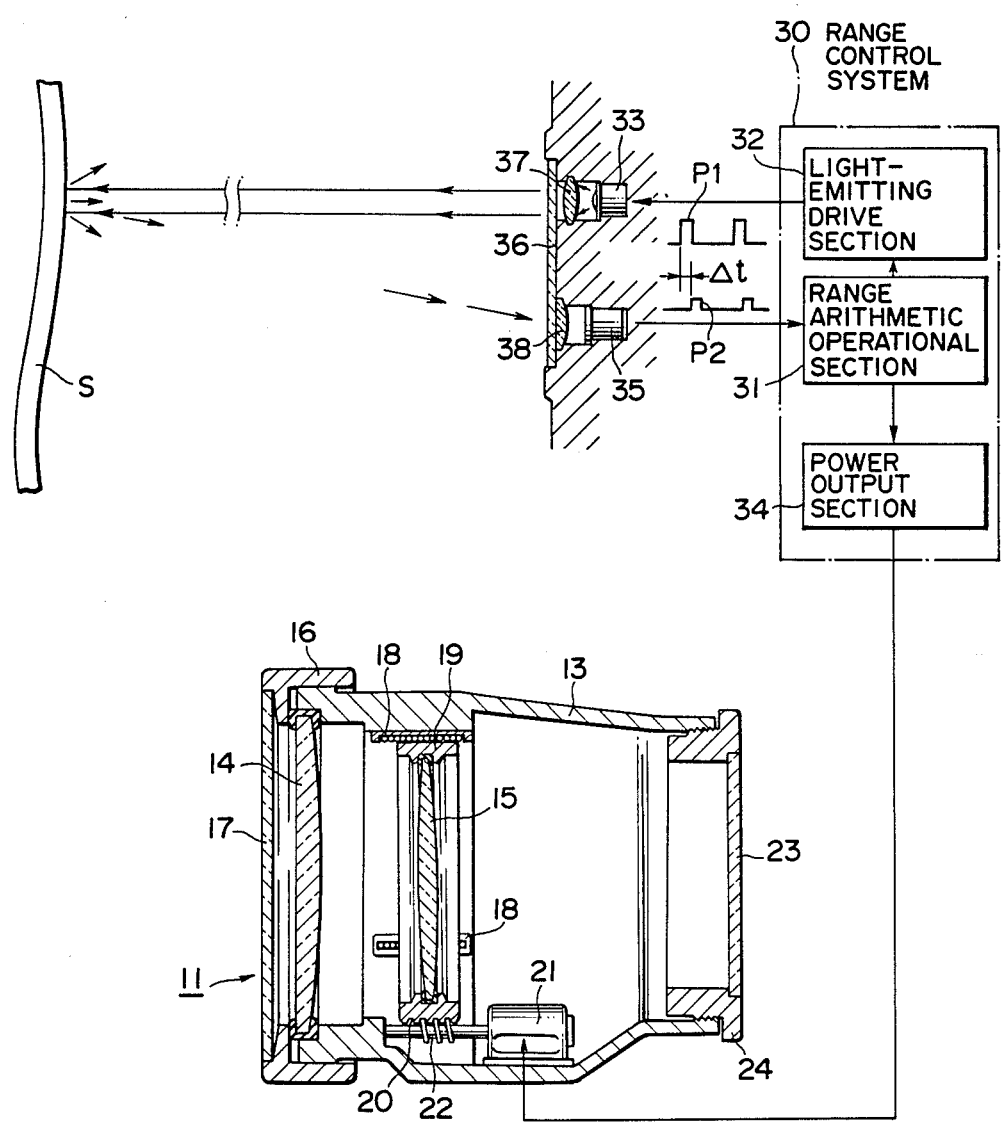
FIG. 2 is a sectional view showing a schematic structure of the magnifier and focus-adjusting means in FIG. 1.

Referring now to FIGS. 1 and 2 showing one embodiment, spectacles with a magnifier according to the present invention comprises a main frame 1 and a magnifier 10 coupled thereto. The main frame 1 mounts a pair of main lenses 2, and temples 4 are connected to opposite ends thereof and extend rearwardly as with normal reading glasses. The main lenses can have a refractive index, and can be convex lenses for myopia, concave lenses for hypermetropy or mixed lenses. However, in the present invention, glass lenses without curved surfaces or plastic plates may be included other than those described above.

A magnifier 10 comprises a pair of magnifier elements 11 and a base body 12 which connects the elements 11 and encasing therein various focus control systems which will be described later.

As can be best shown in FIG. 2, the magnification element 11 comprises a tubular body 13, a fixed objective lens 14 and a movable ocular 15. The objective lens 14 is fixedly held by an annular objective cap 16 engaged in the front portion of the tubular body 13. A front opening of the objective cap 16 is closed by a transparent protective plate 17. The movable ocular 15 is held within a movable annular frame 19 provided movably in an optical direction by bearings 18. The movable annular frame 19 has a rack 20 at a part of the outer peripheral surface thereof. The focus-adjusting means for laterally moving the slidable tube 19 is composed of a motor 21 such as a pulse motor mounted within the tubular body 13, a worm gear 22 formed on a rotatable shaft of the motor 21, and a rack 20 for the movable annular frame 19 and meshing with the worm gear 22. Accordingly, when the motor 21 is rotated, the movable annular frame 19 and the ocular 15 laterally move along the optical axis to vary the focal length of the magnifier composed of lenses 14 and 15. That is, in this embodiment, both lenses 14, 15 are constituted by convex lenses. When the ocular 15 is moved close to the objective lens 14 by normal rotation of the motor 21, the focal length becomes long, and conversely the focal length becomes shorter with reverse rotation of the motor 21. The rear end of the tubular body 13 is closed by an ocular cap 24 having a transparent protective plate 23. If the magnification lenses 14, 15 are formed of material such as plastic, the magnifier can be light in weight, and easy to manufacture.

The thus structured magnification elements 11 are respectively connected to both ends of the base body 12 and mounted on the front portion of the main frame 1 together with the base body 12. Mounting holes 5 are bored in suitable positions of the lenses 2, the tubular body 13 of the magnifier element 11 is inserted into the hole, the base body 12 is mounted on the bridge portion of the main frame connecting both the lenses.

The respective magnifier elements 11 are given control commands for adjusting the focal point of the magnifier to the distance from the magnifier to an object S being viewed. For this purpose, a range measuring and control system comprising a range sensor and computer circuit is housed in the base body 12.

While in this embodiment, a range system using infrared beams is employed, it is to be noted that a system is not limited to this range measuring system.

As shown in FIG. 2, a range measuring and control system 30 comprises a range arithmetic operational section 31, a light-emitting drive section 32 for applying a drive pulse to a light-emitting element 33 such as an infrared light-emitting diode, and a power output section 34 for driving a motor 21 of the magnifier element 11 on the basis of the result of arithmetic operation of the range arithmetic operational section 31. That is, the beam emitted from the light-emitting element 33 is projected on the object S being viewed, and a light-receiving element 35 receives scattered light reflected by the object S being viewed, which is subjected to photoelectric conversion and sent to the range arithmetic operational section 31. The light-emitting element 33, the light-receiving element 35 and the range arithmetic operational section 31 constitute a measured range sensor. A signal applied from the light-emitting drive section 32 to the light-emitting element 33 comprises a pulse string P1 having constant intervals, and the distance to the object S being viewed is obtained by the range arithmetic operational section on the basis of a time difference $\Delta t$ between the P1 and a pulse string P2 of reflected light from the object S being viewed. Then, the required synthesized focal length of two lenses of the magnifier elements 11 is calculated and set from the above-mentioned time difference $\Delta t$, and necessary focus command signal is applied so as to cause the motor 21 of the magnifier element 11 which is the element of the focus-adjusting means to effect required angular motion. Thereby, the magnifier element 11 and the ocular 15 are moved forward and rearward so that the focal length is matched with the distance to the object S. If the range measuring and control system 30 which executes the aforesaid automatic focusing function is constituted by one chip integrated circuit or the like, the apparatus may be miniaturized and light in weighted. Also, the use of the infrared pulse beam is advantageous in achieving excellent responsiveness of the motor 21. Accordingly, when a laser wearing the spectacles constructed as described above observes the object, a magnified image with the focal point adjusted can be always seen despite the distance from the spectacles to the object. Moreover, even if the wearer moves and the distance is varied, the aforesaid automatic focusing function may be actuated to promptly obtain a proper focal point.

While the optical systems of the light-emitting element 33 and the light-receiving element 35 are juxtaposed internally of a light-transmissive panel 36 which protects a window portion approximately in the center of the base body 12 of the magnifier, it is to be noted that these optical systems can be installed at any part of the base body or the magnifier. Also, the control system 30 and batteries such as a drive power supply for the electric motor may be encased in the base body 12. The drive power supply may be supplied from the exterior, if necessary. Further, it is necessary to converge light of the light-emitting diode used as a constituent element of the light-emitting element 33 into beams to apply a spot irradiation to the object, and therefore, it is suggested that a converging lens 37 or the like is disposed frontwardly in the light-emitting element 33 as shown. Similarly, a lens 38 can be provided to collect light incident upon the light-receiving element 35. While in this embodiment, the range sensor using infrared beams has been provided, it is noted that an image-adjusting type range measuring means in the form of CCD image pickup element or other range sensors may be used.

Figure 3:
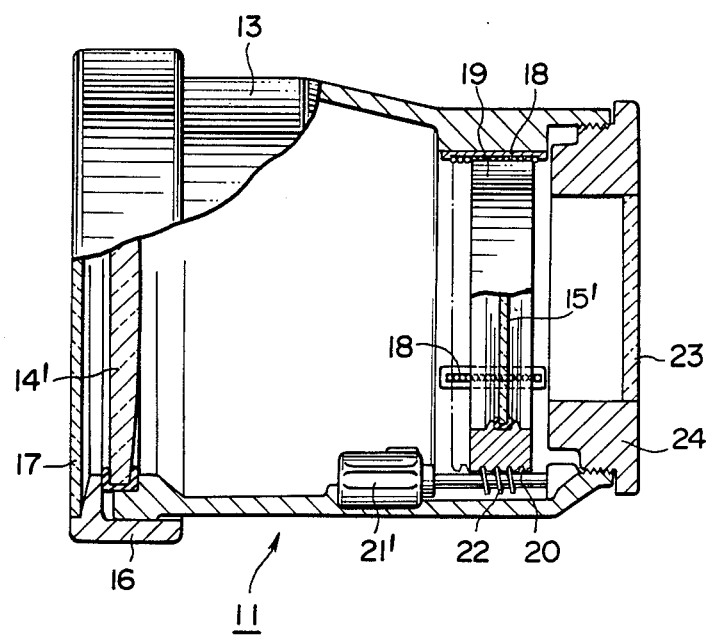
FIG. 3 is a partly cutaway side view of a magnifier in a further embodiment according to the present invention.

The aforementioned magnifier element 11 comprises two convex lenses, that is, it employs a lens construction that may be seen in a so-called microscope. However, a magnifier can be constituted by a suitable combination of a plurality of lenses having either positive or negative characteristics. Also, as shown in FIG. 3, a magnifier can be constituted by use of a convex lens for the objective lens 14' and a concave lens for the ocular 15'. In this case, the magnifier exhibits a so-called tele-characteristic. A mere difference of this embodiment in construction from that of the FIG. 1 embodiment is that a drive motor 21' is disposed between the objective lens 14' and the ocular 15'. This embodiment has approximately the same construction and operation as the previous embodiment. The constituent elements indicated by the same reference numerals as those used in the previous embodiment are the same or equivalent elements, and detailed explanation thereof is omitted.

The magnifier element 11 shown in FIG. 3 is, likewise to the previous embodiment, secured to the main frame, and the wearer merely peeps through the magnifier to always look at a magnified image of the object which is adjusted in focal point.

Figure 5:
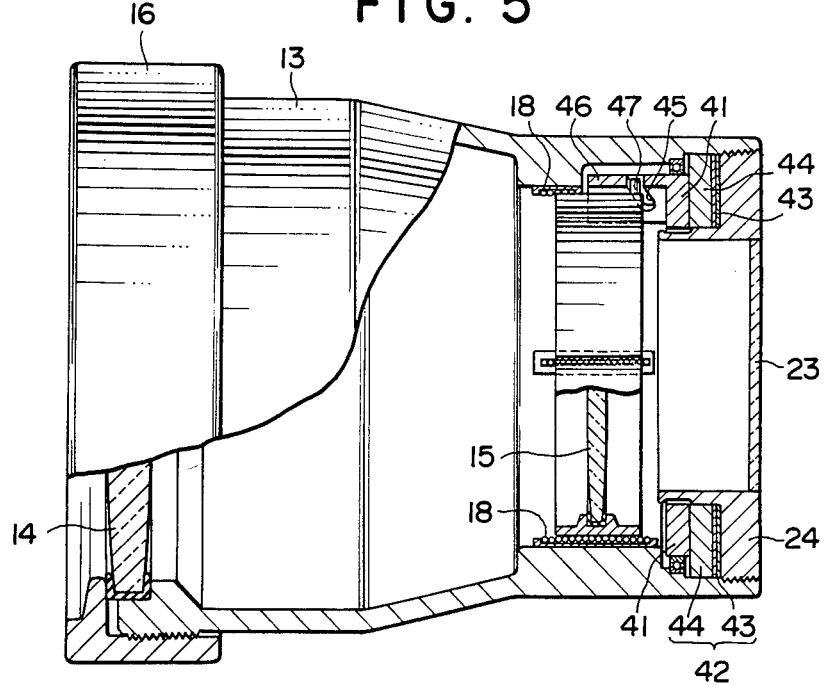
FIG. 5 is a partly cutaway side view of FIG. 4.
Figure 4:
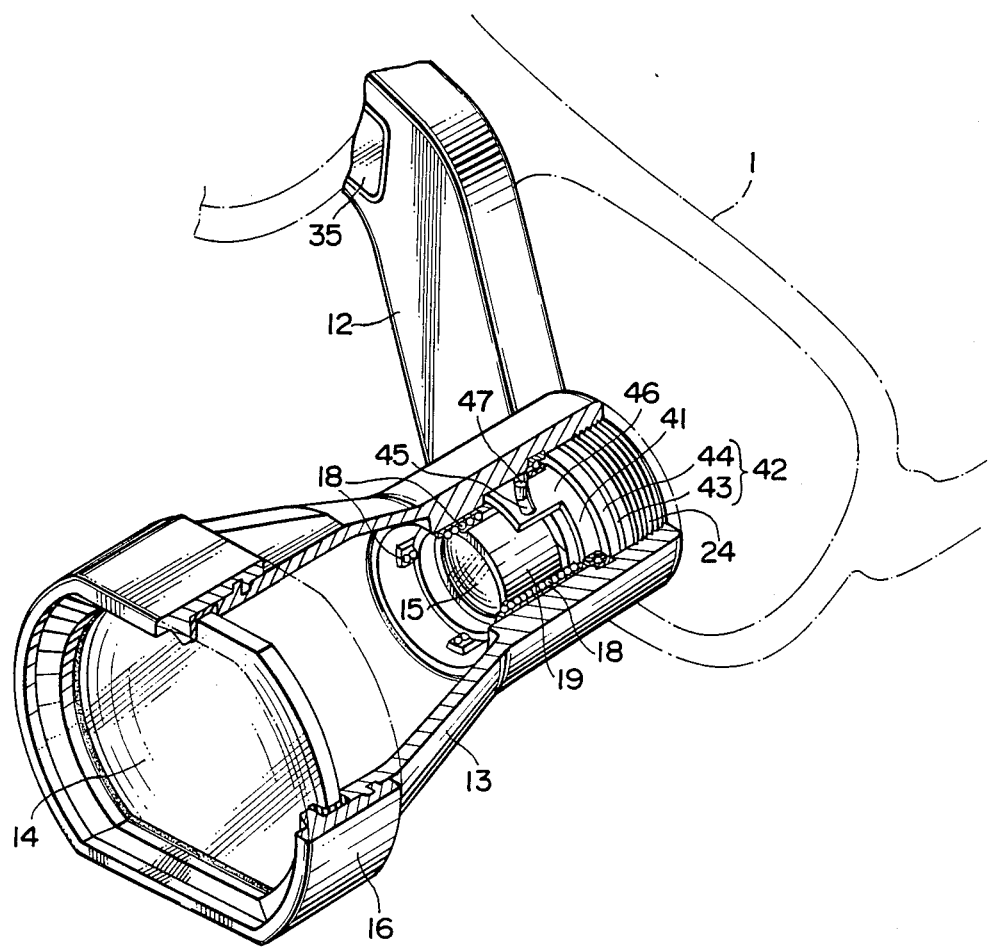
FIG. 4 is a partly cutaway perspective view of a magnifier in another embodiment.

In a still another embodiment shown in FIGS. 4 and 5, there is shown a magnifier which employs an ultrasonic motor 40 which is small and light-weight and can obtain a drive force with small current and high torque. Here, also, the same reference numerals as those of the previous embodiment indicate constitutent elements which are the same as or equivalent thereto. This ultrasonic motor 40 comprises an annular rotor 41 rotatably provided on the tubular body 13 of the magnifier and an annular stator 42 secured to the tubular body 13. The stator 42 has a vibrator 44 such as a piezo-electric element or electric-strain element attached to the back of a vibratory body 43 which is a resilient body. A current of given frequency is applied to the vibrator 44 to induce a progressive wave in the resilient vibratory body 43 thereby rotating a rotor 41 in contact with the vibratory body 43 in one direction. If the phase of frequency current applied to the vibrator 44 is inverted, the rotor 41 may be angularly rotated in a suitable direction.

An arc cam 46 having a guide hole 45 is extended from the rotor 41 parallel to the optical axis. On the other hand, a movable annular frame 19 which is movable in a direction of an optical axis is disposed so that it is opposed at its part of outer periphery to the cam 46, and a guide pin 47 slidably fitted into the guide hole 45 is projected on the outer peripheral surface of the movable annular frame 19. Accordingly, if the rotor 41 of the motor 40 is angularly rotated, the guide pin 47 of the movable annular frame 19 is relatively slidably moved along the guide hole 46 of the cam 46, and the movable 19 is moved in either a forward or backward direction. Thereby, the synthesized focal distance of the lenses 14, 14 is varied to obtain the intended focal distance of the magnifier. As mentioned above, the positive and negative characteristics of the lenses 14, 15 may be set according to the object of either magnification effect of the microscope or the tele-magnification effect, and the installing position of the motor 40 may be suitably decided according to the spacing between the lenses 14 and 15. That is, the motor 40 can be arranged between both the lenses. With this structure of the ultrasonic motor, the apparatus may be miniaturized and light in weight.

It is noted that in place of the aforesaid motor, a movable lens may be moved in a direction of an optical axis by the electric-strain effect caused by a piezo-electric element or an electric-strain element.

Figure 6:
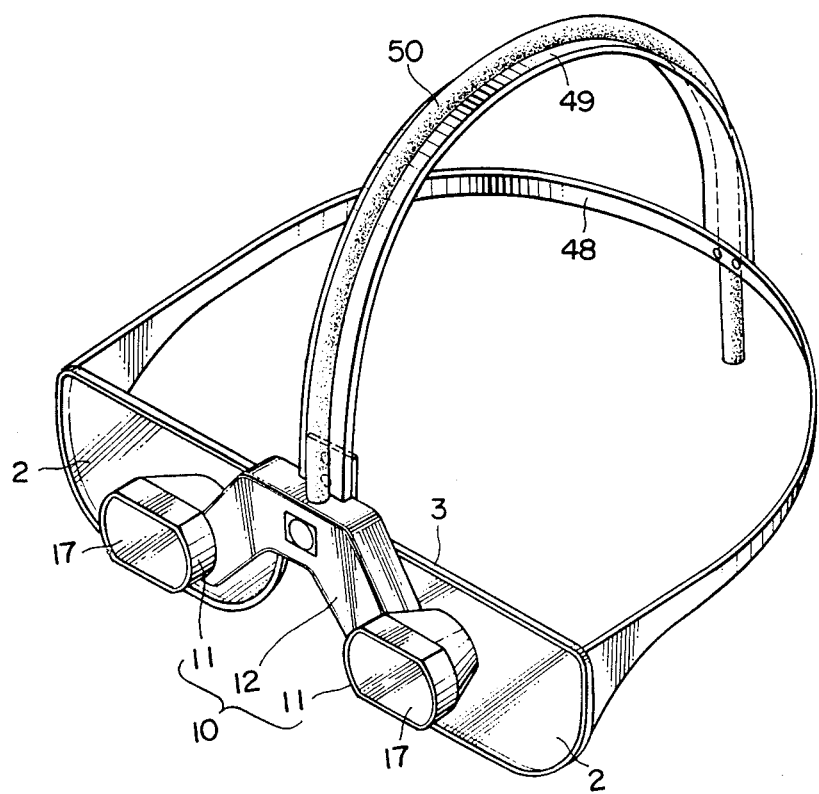
FIG. 6 is a perspective view showing another embodiment of spectacles according to the present invention.

FIG. 6 shows another embodiment of spectacles according to the present invention wherein an annular band 48 is mounted so as to connect both ends of a frame 3 holding lenses 2, and a semicircular top band 49 is extended between the middle portion at the rear of the annular band 48 and the approximately central position of the base body 12, whereby the spectacles can be put over the head.

In this case, if both or either of the annular band 48 and the top band 48 is made adjustable in length, the spectacles can be used while being adjusted to the size of the head of the user. With this configuration as in the head band as described, the weight placed on the nose can be received by the head band to avoid fatigue during long operations. There is a further advantage in that if a cord 50 for connection to a power supply or the like is attached to the inventive apparatus and extends rearwardly of the head along the top band 49, the cord will remain out of the way.

The inventive spectacles can be used not only by surgeons during various surgical operations, but can be used by industrial workers when engaging in fine mechanical procedures and by persons suffering from amblyopia.

What is claimed is:

1. Spectacles which enable a wearer to see a normal view of an object and a magnified view of a portion of an object, said spectacles comprising a first main lens having a front side and a rear side, a second main lens having a front side and a rear side, a connecting means extending between said first and second main lenses and positionable over a wearer's nose, a first magnifying device which extends forwardly of the front side of said first lens, said first magnifying device including a first tubular housing, a first fixed lens which defines a first optical axis fixedly connected to said first tubular housing, a first annular frame movably positioned within said first tubular housing, and a first movable lens which is mounted within said first annular frame to be movable in parallel with said first optical axis, a second magnifying device which extends forwardly of the front side of said second lens, said second magnifying device including a second fixed lens which defines a second optical axis and a second movable lens which is movable in parallel with said second optical axis, first and second drive means for respectively moving said first and second movable lens, said first drive means including a first motor mounted within said first tubular housing and operatively connected to said first annular frame to move said first movable lens toward or away from said first fixed lens, and a range and control means for determining a distance to an object lying along said first and second optical axes and for controlling said drive means so as to move said first and second movable lenses and thereby adjust the focal length of said first and second fixed lenses.

2. Spectacles according to claim 1, wherein said second magnifying device includes a second tubular housing, wherein said second fixed lens is fixedly connected to said second tubular housing, wherein said second movable lens is mounted within a second annular frame which is movably positioned within said second tubular housing, and wherein said second drive means includes a second motor mounted within said second tubular housing and operatively connected to said second annular frame to move said second movable lens toward or away from said second fixed lens.

3. Spectacles according to claim 2, wherein said first and second motors are electromagnetic pulse motors.

4. Spectacles according to claim 2, wherein said first and second motors are ultrasonic motors.

5. Spectacles according to claim 1, wherein said range and control system includes a light-emitting element which emits a beam of light, light-receiving element for sensing a reflective portion of said beam of light, a light-emitting drive section which is connected to said light-emitting element, a power output section which is connected to said drive means, and a range arithmetic operational section which receives signals from said light-receiving element and is connected to said light emitting drive section and said power output section.

6. Spectacles according to claim 5, wherein said light-emitting element comprises an infrared light-emitting diode.

7. Spectacles according to claim 1, wherein said first and second lenses are convex objective lenses and wherein said first and second movable lenses are convex ocular lenses.

8. Spectacles according to claim 1, wherein said first and second lenses are convex objective lenses and wherein said first and second movable lenses are concave ocular lenses.

9. Spectacles according to claim 1, wherein each of said first and second main lenses includes an opening therein, and wherein said first and second magnifying devices are respectively mounted in said openings.

10. Spectacles which enable a wearer to see a normal view of an object and a magnified view of a portion of an object, said spectacles comprising
a first main lens having a front side and a rear side,
a second main lens having a front side and a rear side,
a connecting means extending between said first and second main lenses and positionable over a wearer's nose, said connecting means comprising a portion of a main frame in which said first and second main lenses are mounted,
a first magnifying device which extends forwardly of the front side of said first lens, said first magnifying device including a first fixed lens which defines a first optical axis and a first movable lens which is movable in parallel with said first optical axis,
a second magnifying device which extends forwardly of the front side of said second lens, said second magnifying device including a second fixed lens which defines a second optical axis and a second movable lens which is movable in parallel with said second optical axis,
first and second drive means for respectively moving said first and second movable lenses,
a base body connected between said first and second magnifying elements and mounted on said main frame, and
a range and control means for determining a distance to an object lying along said first and second optical axes and for controlling said drive means so as to move said first and second movable lenses and thereby adjust the focal length of said first and second fixed lenses, said range and control means being positioned in said base body.

11. Spectacles according to claim 10, wherein said second magnifying device includes a second tubular housing, wherein said second fixed lens is fixedly connected to said second tubular housing, wherein said second movable lens is mounted within a second annular frame which is movably positioned within a second tubular housing, and wherein said second drive means includes a second motor mounted within said second tubular housing and operatively connected to said second annular frame to move said second movable lens toward or away from said second fixed lens.

12. Spectacles according to claim 11, wherein said first and second motors and electromagnetic pulse motors.

13. Spectacles according to claim 11, wherein said first and second motors are ultrasonic motors.

14. Spectacles according to claim 10, wherein said range and control system includes a light-emitting element which emits a beam of light, a light-receiving element for sensing a reflective portion of said beam of light, a light-emitting drive section which is connected to said light-emitting element, a power output section which is connected to said drive means, and a range arithmetic operational section which receives signals from said light-receiving element and is connected to said light-emitting drive section and said power output section.

15. Spectacles according to claim 14, wherein said light-emitting element comprises an infrared light-emitting diode.

16. Spectacles according to claim 10, wherein said first and second lenses are convex objective lenses and wherein said first and second movable lenses are convex ocular lenses.

17. Spectacles according to claim 10, wherein said first and second lenses are convex objective lenses and wherein said first and second movable lenses are concave ocular lenses.

18. Spectacles according to claim 10, wherein each of said first and second main lenses includes an opening therein, and wherein said first and second magnifying devices are respectively mounted in said openings.

19. Spectacles according to claim 10, including temples connected to opposite ends of said main frame so as to extend over a wearer's ears.

20. Spectacles according to claim 10, including a first band connected to opposite ends of said main frame so as to extend around the sides and rear of a wearer's head, and a second band connected at one end to said base body and at a second end to said first band so as to extend over the top of a wearer's head.

* * * * *